May 10, 1955 C. P. FELDHAUSEN ET AL 2,708,259
POSITIONING SYSTEM FOR MOTOR DRIVEN DEVICES
Filed Nov. 22, 1952
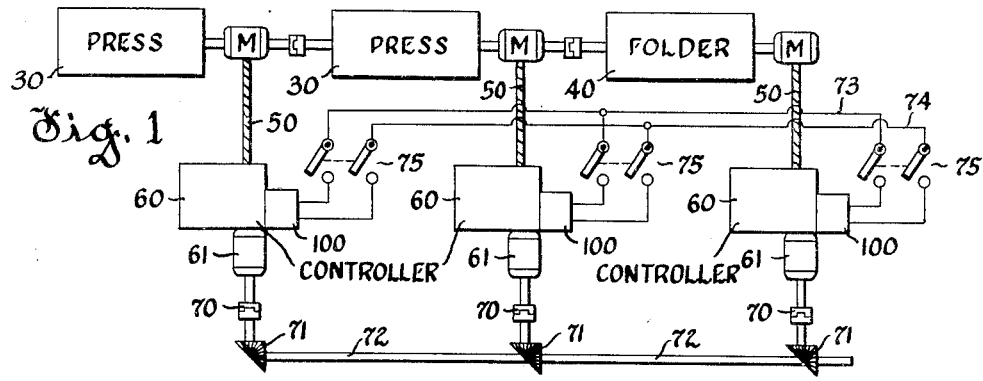
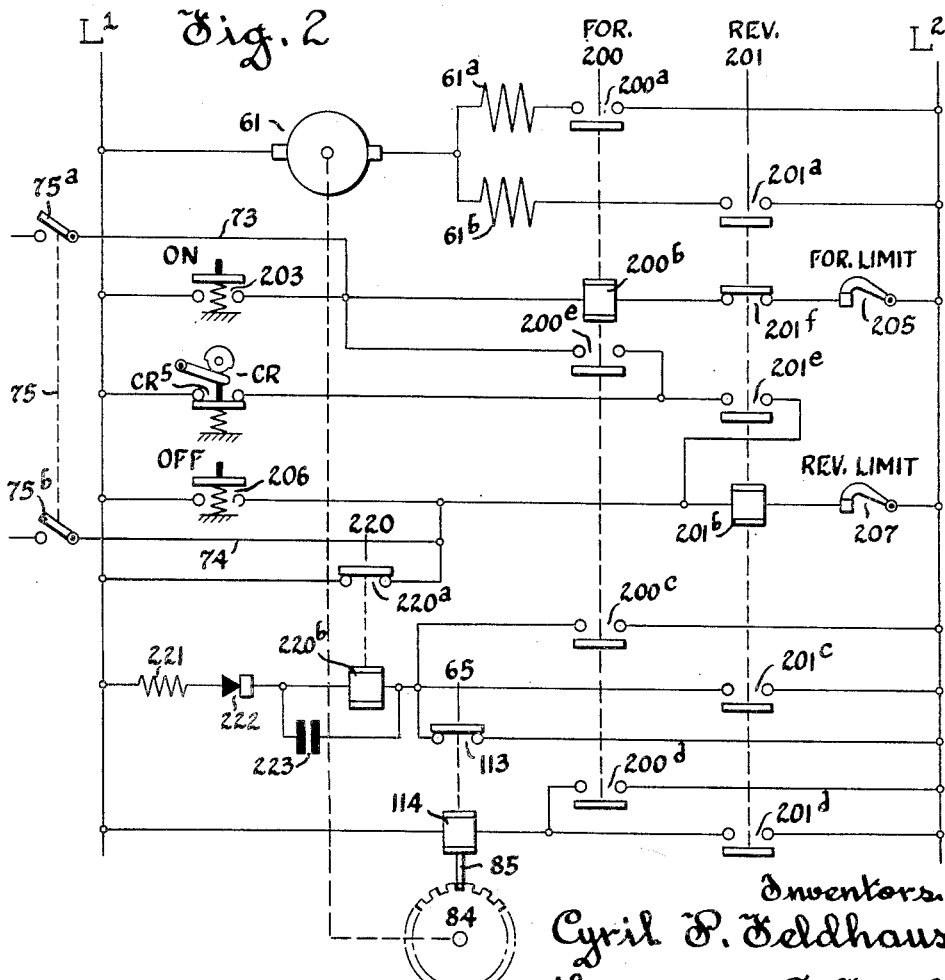
Inventors
Cyril P. Feldhausen
Lawrence H. Yerk
By W. C. Lyon
Attorney

United States Patent Office 2,708,259
Patented May 10, 1955

2,708,259

POSITIONING SYSTEM FOR MOTOR DRIVEN DEVICES

Cyril Paul Feldhausen, Wauwatosa, and Lawrence Anthony Ferk, Milwaukee, Wis., assignors to Cutler-Hammer, Inc., Milwaukee, Wis., a corporation of Delaware Application November 22, 1952, Serial No. 322,028

6 Claims. (Cl. 318—261)

This invention relates to electrical controllers of the multi-position motor driven type, and, more particularly, to an improved electrical control system therefor.

In United States patent application Serial Number 171,854, filed by Theodore B. Jochem on July 3, 1950, now Patent No. 2,672,579 and assigned to the same assignee as the instant application, there is shown and described a novel electrical controller particularly suitable for printing press drive motors or the like. As best shown in Figures 3 through 7 in the above application, relay CR, positioning mechanism 64 and position lock 65 (which cooperates with indexing wheel 84 of positioning mechanism 64) cooperate to insure that whenever the controller is moved to a new operating position the switch drums 66, 69, and 71 will stop in a fully open or fully closed position. These members and the control system shown in Figure 19 of the above-mentioned application provide the means whereby remote control of the controller driving motor 61 is effected. Although this system has been quite satisfactory and has met with considerable commercial success, some difficulty has been experienced when two or more of these controllers are connected in parallel for simultaneous operation of two or more press units or motors. When this is done, if the On and Off pushbuttons are depressed simultaneously, it has been found possible to have one pilot motor energized to drive its drums in the Increase direction and a second pilot motor energized to drive its drums in the Decrease direction. This causes jamming of the mechanism. It has also been found that unless at least five circuits are used to connect the pilot motor control systems together it is possible to jam the mechanism by just lightly touching an On button which might result in energizing the On contact on one panel but not on the second panel. Then when the Off button is depressed, the Off switch on the second panel would close and both pilot motors would be energized in opposite directions. Although these disadvantages have in no way interfered with the commercial application of the controller shown in the above-mentioned patent application, they have nevertheless left something to be desired.

Accordingly, it is an object of this invention to provide an improved electrical control system for the pilot motor of a multi-position controller in which accurate positioning of the switch drum elements is obtained by use of a solenoid-engaged indexing wheel.

Another object of this invention is to provide an improved control system which positively protects against simultaneous energization of both On and Off circuits.

Another object is to provide positive electrical interlocking between the On and Off control buttons.

A further object is to provide an improved control system which minimizes the possibility of jamming parallel-connected controllers when the On and Off control buttons are operated rapidly.

A further object of the invention is to provide a control circuit which is less complicated but does not eliminate any of the functions provided by the older circuit.

Another object is to provide a control circuit which requires the use of fewer control devices and reduces wear on the drum controller positioning means.

Other objects and advantages will hereinafter appear.

In the accompanying drawing,

Figure 1 is a schematic view of a typical unit type press installation in which the motor controllers are adapted for both electrical and mechanical interlocking.

Fig. 2 is a schematic and diagrammatic view of our improved control system, including certain parts of the controller disclosed in the aforementioned Jochem application to illustrate the relationship therewith.

Referring to Fig. 1, there will be seen a printing press comprising two unit-type presses 30 and a folder 40 each of which are connected for driving by a main motor M. Each of said motors is connected by means of electrical cables 50 to individual multi-position controllers 60 of the type disclosed in the aforementioned Jochem patent. A controller driving motor 61 is mounted on each of said controllers for driving the contact drums (not shown) thereof and is provided with a control system 100 by means of which it is driven in the Increase or Decrease direction as required. Mechanical coupling between the motors 61 may be accomplished by means of clutches 70, gears 71 and shafts 72 or any other suitable means. Electrical coupling between the controllers 100 for the motors 61 may be effected by means of leads 73, 74 and switches 75 having poles 75$^a$ and 75$^b$. The exact manner in which the leads 73 and 74 connect into the driving motor control system will hereinafter appear. The reason for interlocking the several controllers when the press units are connected in tandem is to insure that all units operate in synchronism and to permit control of all units by operation of a switch on any one of the parallel-connected control panels.

In applying the improved control system to a controller of the type shown in the beforementioned Jochem patent application, the controller must be changed in a few minor respects. The normally open contacts 113 shown in Fig. 6 of said application must be reversed to make them normally closed. The winding CR$^2$ and the normally open contacts CR$^3$ of relay CR shown in Fig. 7 of said application may be removed or the relay CR itself replaced by any normally-closed switch which may be mounted for actuation by the ratchet wheel 92. The manner in which this may be done will readily appear to one skilled in the art. Other than the changes to the control panel, no other changes need be made to the controller in order to incorporate the new and improved control system. The positioning mechanism and the position lock work in substantially the same way except that the improved control system provides for a coasting stop instead of driving into the latch.

Referring to Fig. 2 of the present application, it will be seen that for purposes of clarity certain of the elements are shown and numbered as they appear in said Jochem application. Lines L$^1$ and L$^2$ represent a single phase alternating current source across which is connectible a split field A. C. motor 61 with individual field windings 61$^a$ and 61$^b$ by means of contacts 200$^a$ and 201$^a$ of electromagnetic contactors 200 and 201 respectively. The winding 200$^b$ of contactor 200 is connected across the lines L$^1$ and L$^2$ in series with the manually closable On switch 203, the normally-closed contacts 201$^f$ of contactor 201, and a limit switch 205 which is set to open when the drum controller reaches the limit of rotation in the Forward or Increase direction. The normally-closed contacts CR$^5$ of switch CR (similar to the relay CR of the Jochem application but without the magnetic actuating feature) is connectible in parallel with the On switch 203 by means of normally-open contacts 200$^e$ of contactor 200 and in parallel with the Off switch 206 by means of normally-open contacts 201ᵉ of contactor 201. Manually closable Off switch 206 is connected across lines L¹, L² in series with the winding 201ᵇ of the Reverse contactor 201, and the limit switch 207 which is set to open when the controller reaches the limit of rotation in the Reverse or Decrease direction.

A time delay relay 220 has normally closed contacts 220ᵃ which are connected in shunt with Off switch 206 and a winding 220ᵇ which is connected across the lines L¹, L² in series with the parallel-connected contacts 200ᶜ, 201ᶜ and 113. A voltage drop resistor 221 and a rectifier 222 are also connected in series with the time delay relay when the power source is alternating current. In order to effect a slight delay in the closing of relay contacts 220ᵃ upon de-energization of relay 220, a capacitor 223 is preferably connected in shunt with the relay winding 220ᵇ.

The drum controller position lock 65 includes a winding 114 which may be connected across the power source by either contacts 200ᵈ of Forward contactor 200 or contacts 201ᵈ of Reverse contactor 201, and also includes an armature member 85 which cooperates with the indexing wheel 84 to insure proper positioning of the controller drum mechanism. When winding 114 is energized by closure of either the Forward or Reverse contactors, the contacts 65 are opened and the armature member 85 withdrawn from engagement with the index wheel 84 to permit rotation thereof.

Leads 73, 74 and switch 75, having poles 75ᵃ, 75ᵇ, are provided to effect parallel connection with similar controllers. The lead 73 is connected between the On switch 203 and the On or Forward contactor winding 200ᵇ. The lead 74 is connected between the Off switch 206 and the Off or Reverse contactor winding 201ᵇ. Both leads are to be connected to corresponding points in the other controller control systems when parallel operation is desired. A switch 75 of any suitable type is provided for effecting the connection and it should be noted that no other electrical interconnections are required.

Although the operation of the control system will now be explained as applied to only a single controller, it is to be understood that if two or more of said control systems were connected in parallel all units would operate in the same manner.

Still referring to Fig. 2, pressing the On button 203 will energize the Forward contactor 200 and consequently the field winding 61ᵃ to drive the motor 61 in the accelerating direction. At the same time closure of contacts 200ᵉ will maintain the contactor winding 200ᵇ through normally-closed contacts CR⁵ of switch CR, closure of contacts 200ᶜ will maintain the time delay relay energized and hold open the contacts 220ᵃ as closure of contacts 200ᵈ energizes the position lock winding 114 to release the index wheel 84 and open contacts 113. The controller drums will then continue to move in the accelerating direction as long as the On button is depressed or until the limit switch 205 is opened.

When the On button 203 is released the Forward contactor will not drop out until the contacts CR⁵ are opened by the lever and cam arrangement CR which functions each time the controller drums advance one step. Opening of the various contacts of contactor 200 will de-energize the motor 61, deenergize the position lock 65 and open the circuit through the relay 220. However, the relay circuit will be immediately re-established as the armature member 85 drops into one of the slots in the index wheel 84 to position the drums and permits contacts 113 to close. The time delay characteristic of relay 220 will normally prevent the closing of relay contacts 220ᵃ before closure of solenoid contacts 113.

Pressing the Off button 206 will energize the Reverse contactor 201 which also will maintain through the contacts CR⁵ which are connected in series with the normally-open contacts 201ᵉ. The motor field winding 61ᵇ will then be energized to drive the motor 61 in the Reverse direction and will remain energized until the switch 206 is released or the limit switch 207 is opened. The various contacts on contactor 201 will also energize the position lock solenoid 114, maintain energized the relay 220 and open the circuit through the operating winding 200ᵇ of contactor 200 by opening interlock contacts 201ᶠ. These latter contacts give the Off or Reverse direction preference over the On direction and thus prevent jamming when the On and Off buttons are depressed simultaneously.

When the controller drums are properly positioned on a step and the armature member 85 is positioned in a slot in the wheel 84, the position lock contacts 113 will be closed, relay 220 will be energized, and the normally-closed contacts 220ᵃ on relay 220 will be open. Thus in normal operation the relay 220 is not required to operate since its circuit is always completed either through the position lock contacts 113 or the contacts 200ᶜ and 201ᶜ of the Forward and Reverse contactors. However, if after movement in either the Forward or Reverse direction and opening of the switches 203 and 206, the controller should stop or stall between steps on the drums, contacts 113 will remain open and the relay 220 will be de-energized to permit the relay contacts 220ᵃ to close. Closing of said contacts will complete a circuit through the Reverse contactor which will momentarily energize the motor 61 and cause the controller to make one step in the Reverse direction. The armature member 85 can then move into one of the slots in index wheel 84 and close contacts 113 which in turn will effect opening of relay contacts 220ᵃ and consequent opening of Reverse contactor 201. Thus it will be seen that whenever the controller drums are rotated in either direction and stop between a position, the drums will automatically be moved one step in the Reverse direction to correct the condition. This method of automatically clearing a fault as well as its simplicity and safety is believed to make the instant control system a vast improvement over prior control systems intended for use with drum-type motor controllers. It is not intended, however, to limit the invention to use with such controllers because it is apparent that it could be used in other applications such as, for example, machine tools.

We claim:

1. In combination, a rotatable member for rotation to predetermined positions; power operating means therefor; and control means for the latter to effect rotation of the former in opposite directions to different degrees, said means including a locking member engageable with said rotatable member and delayed action unidirectional starting means for said power operating means responsive to movement of said locking member to effect further movement of said rotatable member following rotation thereof in either direction and failure to stop in one of said predetermined positions.

2. In combination, a device including an indexing wheel rotatable to predetermined positions; an electric driving motor operably connected to said wheel; electromagnetically withdrawn locking means arranged for locking said wheel only in said predetermined positions; and control means including unidirectional starting means for said motor rendered operable upon failure of said locking means to lock said wheel when released for locking engagement therewith.

3. In combination, an indexing member to be stopped in predetermined positions; electromagnetically withdrawn locking means normally urged toward said indexing member and prevented from locking engagement therewith except in said predetermined positions of said member; an electric driving motor for said member; separate electromagnetic switch means selectively energizable for effecting operation of said motor in opposite directions and each including means for effecting energization of said locking means; and time delayed switch means operable for effecting energization of one of said first-mentioned switch means and rendered operable by failure of said locking means to lockingly engage said member upon opening of both of said first-mentioned switch means.

4. A control system for a multi-position electric motor controller comprising, in combination, a motor for driving said controller; a positioning mechanism for said controller including an indexing wheel connected for driving by said motor; an electromagnetically withdrawn locking member normally urged into engagement with said wheel, and including normally-closed contacts arranged for opening upon withdrawal of said locking member from said wheel; an electromagnetic relay having a pair of normally-closed contacts and an operating winding connectable across a power source by said first-mentioned contacts; and a multi-pole electromagnetic switch including normally-open poles for connecting to a power source said motor and the operating windings of said electromagnetic locking member and relay, the operating winding of said switch being connectable to a power source by said relay contacts whereby upon simultaneous opening of said switch contacts and said locking member contacts said relay contacts will close to effect energization of said motor until said locking member contacts close.

5. In a reversible motor driven device having means to lock the same in any one of a number of selected positions, said means including electromagnetic means for effecting unlocking and relocking of said device; power controlling means for said device to effect reverse operations thereof comprising separate selectively energizable electromagnetic reversing switches, said electromagnetic means being under the control of said reversing switches to unlock and relock said device upon energization and deenergization of either reversing switch; and a time element means connected with one of said reversing switches which will for a given setting function in response to either of said reversing switches to effect for a transient period energization of the reversing switch to which it is connected if said locking means fails to assume locking position within a predetermined period.

6. In combination, a device including an indexing member movable to predetermined positions; electromagnetically withdrawn locking means lockingly engageable with said indexing member only in said predetermined positions; power operating means operable to drive said device and said member; control means for said power means to effect adjustment of said device and said indexing member in opposite directions and to various degrees while energizing said locking means; time delayed switching means rendered effective upon failure of said locking means to lock said indexing member within a set time after deenergization of said power operating means; and unidirectional starting means for said power means energizable by said time delayed switching means to effect movement of said device and said indexing member until said locking means lockingly engages said indexing member.

No references cited.